United States Patent [19]

Sakaguchi

[11] Patent Number: 4,653,716
[45] Date of Patent: Mar. 31, 1987

[54] SYNTHETIC RESIN HOLDER

[75] Inventor: Keizaburo Sakaguchi, Tokyo, Japan

[73] Assignee: Sakaguchi Plastic Industrial Co., Ltd., Tokyo, Japan

[21] Appl. No.: 751,653

[22] Filed: Jul. 3, 1985

[30] Foreign Application Priority Data

Jul. 5, 1984 [JP] Japan .................... 59-101675[U]
Mar. 20, 1985 [JP] Japan ................... 60-40991[U]

[51] Int. Cl.4 ........................................... F16L 3/08
[52] U.S. Cl. ............................ 248/316.5; 248/74.5
[58] Field of Search ............... 248/201, 316.7, 316.9, 248/316.6, 74.3, 74.1, 74.5, 113, 68.1, 55, 903, 440, 543, 73; 24/487, 543; 52/689

[56] References Cited

U.S. PATENT DOCUMENTS

| | | | |
|---|---|---|---|
| 2,366,041 | 12/1944 | Morehouse | 248/74.3 |
| 3,471,987 | 10/1969 | Yelsma | 52/689 |
| 3,494,072 | 2/1970 | Olson | 24/487 X |
| 3,954,238 | 5/1976 | Nivet | 248/68.1 |
| 4,061,299 | 12/1977 | Kurosaki | 248/74.5 X |
| 4,191,111 | 3/1980 | Emmert | 248/440 X |
| 4,240,604 | 12/1980 | Brach | 248/316.9 |
| 4,295,618 | 10/1981 | Morota et al. | 248/74.5 X |
| 4,382,570 | 5/1983 | Craig | 248/74.3 |
| 4,386,752 | 6/1983 | Paulak et al. | 248/543 X |
| 4,393,998 | 7/1983 | Allen et al. | 248/74.1 |
| 4,478,381 | 10/1984 | Pittion et al. | 24/487 X |

Primary Examiner—Ramon O. Ramirez
Attorney, Agent, or Firm—David H. Semmes; Warren E. Olsen

[57] ABSTRACT

A synthetic resin holder in which a pair of embracing arms having inner ends connected by a hinge and outer ends butted in an opening and closing manner are integrally connected by hinges on opposite ends of a circular spring plate having a support leg projected in the central portion thereof, and when a connected portion between the embracing arms is moved outwardly from a border-line which connects both ends of the spring plate, the embracing arms are opened, and conversely, when it is moved inwardly, the arms are closed. The present invention provides such a holder as described which can solve the opening of the embracing arms of themselves due to the flexure of the spring plate resulting from the load, vibrations or shocks of an article being held, by the upward provision of the embracing arms along with the spring plate on the base plate.

5 Claims, 7 Drawing Figures

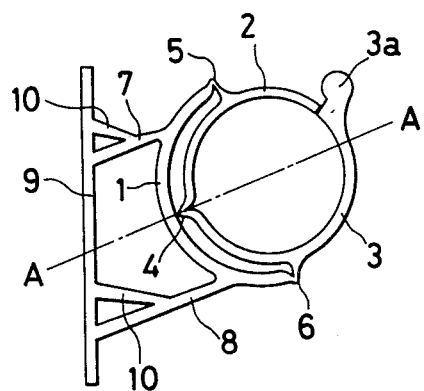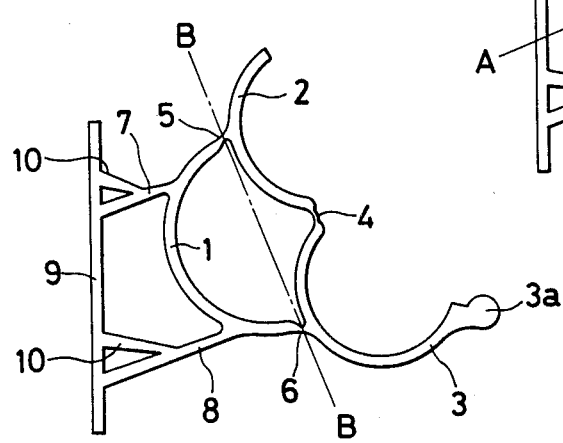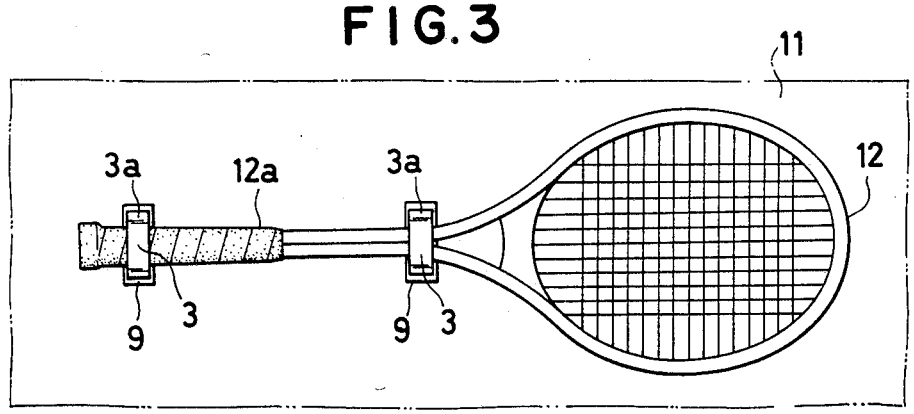

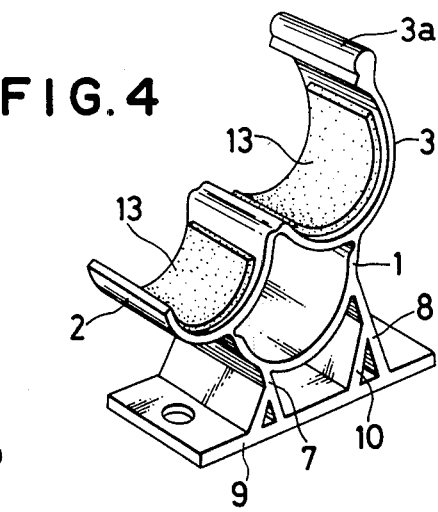
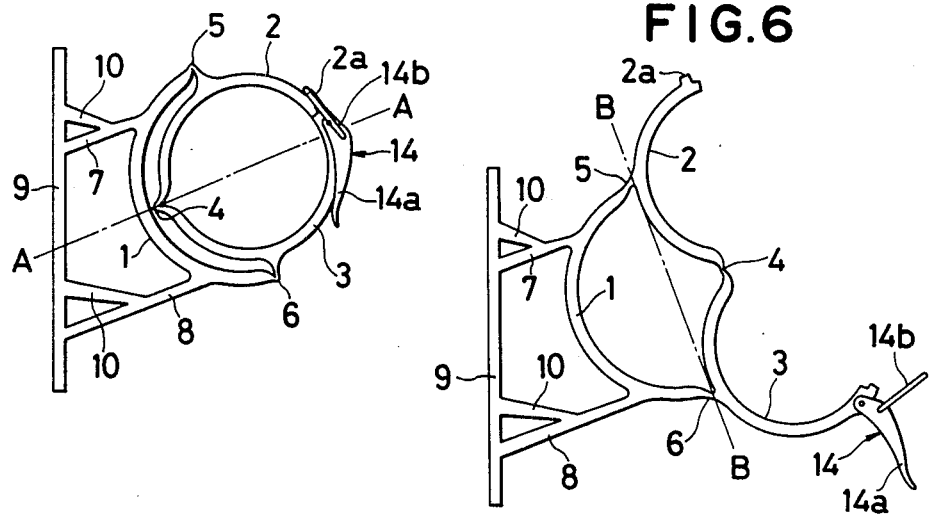
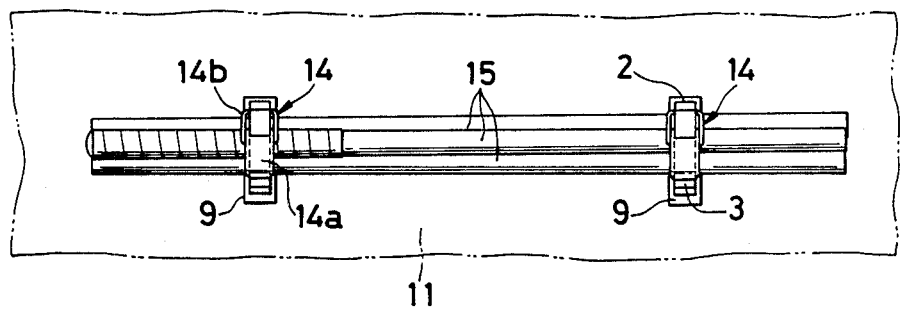

SYNTHETIC RESIN HOLDER

BACKGROUND OF THE INVENTION

1. Field of the Invention

This invention relates to a synthetic resin holder with a spring which is used when a tennis racket, a fishing rod and the like are hung on walls, ceilings or the like.

2. Prior Art

A small synthetic resin holder has already been known from U.S. Pat. No. 4,240,604, in which a pair of embracing arms having inner ends connected by a hinge and outer ends butted in an opening and closing manner are integrally connected by hinges on opposite ends of a circular spring plate having a support leg projected in the central portion thereof, and when a connected portion between the embracing arms is moved outwardly from a border line which connects both ends of the spring plate, the embracing arms are opened, and conversely when it is moved inwardly, the arms are closed.

In such a holder as described above, the embracing arms being opened can be closed merely by pressing the connected portion between the embracing arms and the holder is extremely convenient for use as a holder for doors and electric wires. However, the above-described holder has a disadvantage that when this holder is used, as a holder when a tennis racket, a fishing rod and the like are laterally hung on the ceiling or walls, under the condition that a dimension thereof is increased without modification and the embracing arms are positioned up and down, a load is imposed on the lower embracing arm, the lower end of the spring plate is pressed to flex the spring plate, and the connected portion between the embracing arms are moved outwardly to the embracing arms of itself. To overcome such a disadvantage as noted above, if the whole wall thickness is increased to increase a spring force, or if support plates are provided on opposite ends of a spring plate to support the embracing arms, the flexure of the embracing arms due to the load can be improved to some extent. However, if the whole wall thickness is increased, the spring force is strengthened and if the both ends of the spring plate are supported, the flexure of the spring plate becomes difficult to make, as a consequence of which a force is required to open and close the embracing arms, a great sound occurs every opening and closing the arms and in addition, a handle of the racket, the fishing rod and the like are scratched during a period of opening and closing of the arms

SUMMARY OF THE INVENTION

This invention solves these problems noted above with respect to prior art by mounting embracing arms along with a spring plate upwardly on a base plate without increasing a wall thickness of the spring plate, and provides a holder which can hang even a relatively heavy article on the wall surface.

Another object of the invention is to provide a holder in which embracing arms are not opened of themselves under the influence of a load of a hung article even if they are subjected to repeated great vibrations or shocks, and lengthy articles such as fishing rods can be hung on the walls and ceiling of vehicles such as automobiles, ships and the like.

According to the present invention to achieve the above-described objects, there comprises a pair of embracing arms positioned internally of a circular spring plate, said embracing arms having inner ends connected by a hinge and outer ends butted in an opening and closing manner, said embracing arms being equally connected by hinges to upper and lower ends of the spring plate, a pair oi support plates projected inwardly irom both ends of the spring plate, said support plates being parallel to a center line of a holder and having a lower side formed to be longer than an upper side, and a base plate formed integral with the ends of both the support plates, said spring plate and said embracing arms being provided upwardly With respect to the base plate.

According to the synthetic resin holder as described above, since the spring plate and the pair of embracing arms are provided equally up and down, even if they are provided upwardly with respect to the base plate, an eccentric load is not imposed on each of connected portions, when the embracing arms are opened and closed, whereby the embracing arms can be opened and closed smoothly. Moreover, since a support point of the spring plate by the pair of support plate is positioned inwardly from both ends of the spring plate serving as a support point of the embracing arms, there is no failure in smoothness of opening and closing operation of the embracing arms due to a difficulty of flexure of the spring plate as encountered in the case where the both ends thereof are supported.

Even such a holder, the embracing arms are sometimes opened of themselves by the load of an article being hung by the holder and by the external force generated therefrom when the holder undergoes great vibrations or shocks. However, such a phenomenon can be prevented by the provision of simple stops over the opening and closing ends of the pair of embracing arms. As a result, the holder according to the present invention can be applied also to walls or ceiling of a camping car, a cruiser and the like, in addition to walls or ceiling which are always in a stationary state.

BRIEF DESCRIPTION OF THE DRAWINGS

The drawings show embodiments of a synthetic resin holder according to the present invention.

FIG. 1 is a side view showing the state wherein the embracing arms are closed.

FIG. 2 is a side view showing the state wherein the embracing arms are opened.

FIG. 3 is a front view showing the state wherein a racket is held

FIG. 4 is a perspective view showing the state wherein a holder having a cushion member applied to the inner surface of the embracing arm is opened.

FIG. 5 is a side view showing the state wherein a holder having a stop or retainer mounted on an opening and closing end of the embracing arm is opened.

FIG. 6 is a side view showing the state wherein a holder of FIG. 5 is closed.

FIG. 7 is a front view showing the state wherein a fishing rod is held.

DETAILED DESCRIPTION OF THE INVENTION

In the drawings, reference numeral 1 designates a circular arc-shaped spring plate, and 2, 3 a pair of semi-circular embracing arms having inner ends connected by a hinge 4 and outer ends butted in an opening and closing manner each other.

The embracing arms 2 and 3 are conected by hinges 5 and 6 to upper and lower ends of the spring plate inwardly of the spring plate 1, the embracing arms being pivotally moved each other about the hinges 5 and 6, respectively, and the spring plate 1 can be flexed in relation to a a connected portion between the embracing arms.

A pair of support plates indicated at 7, 8. which are formed integral with each other inwardly from both ends of the spring plate 1 and having a different length from each other, are in parallel with a center line A—A of a holder connecting inner and outer ends of the embracing arms 2, 3 in a closed state and are projected from the spring plate 1 with the lower plate formed to be longer than the other.

A base plate 9 is integrally formed on the ends of the pair of support plates 7, 8, so that the spring plate 1 and the embracing arms 2, 3 are provided upwardly with respect to the base plate 9.

The support plates 7, 8 and the base plate 9 are integrally formed with oblique members 10 to prevent the support plates 7, 8 from being flexed.

Reference numeral 3a designates an arm opening finger-hook integrally formed on a free end of the lower embracing arm 3.

The holder constructed as described above can be mounted on the wall or the like with the embracing arms 2, 3 directed longitudinally, with a base plate 9 fixed to the wall, as shown in FIG. 3. The lower embracing arm is raised by the finger-tip to obtain an open state as shown in FIG. 2 for use.

When a tennis racket 12 or the like is laterally hung on the wall surface 11 by this holder, a handle 12a of the racket is merely pressed into the embracing arms 2, 3 to move a connected portion, which is the hinge 4, inwardly from a line B—B connecting both ends of the spring plate 1. By this pressing, the embracing arms 2, 3 are turned about the hinges 5, 6 as mentioned above, the spring plate 1 is flexed, and the embracing arms 2, 3 are closed as shown in FIG. 1 by restoration of the spring plate 1 as soon as a portion of the hinge 4 passes through a line B—B.

In removing the tennis racket 12 from the holder, the handle 12a is pulled back to pull the embracing arm outwardly, whereby turning and flexing action similar to the foregoing occur and the embracing arms 2, 3 are again opened as shown in FIG. 2. Accordingly, hanging and removing of the tennis racket 12 or the like can be easily accomplished merely by pressing and pulling-back of the handle 12a.

The lower support plate 8 is formed to be longer than the upper support plate 7 to serve as a support for the spring plate 1. and therefore, even if a load such as the tennis racket 12 is applied to the lower portion of the spring plate 1, the load is carried by the support plate 8, because of which the embracing arms 2, 3 are not opened as a result of flexure of the spring plate 1 of itself.

FIG. 4 shows an arrangement wherein sponges 13 are directly attached to inner surfaces of the embracing arms 2, 3 to provide cushions.

It will be noted that the cushion material may be of ones other than those as described above, and supersonic deposition or adhesive tapes can be used for adhesion.

FIGS. 5 to 7 illustrate an arrangement wherein a stop or a retainer 14 is provided over the opening and closing ends of the embracing arms 2, 3. It comprises a stopper 14b provided at an end of a lever 14a and in engagement with a projection 2a provided on the outer surface of one embracing arm 2. A portion frontwardly of a stopper mounting portion of the lever 14a is rotatably provided on the other embracing arm 3 so that engagement and release between the projection 2a and the stopper 14b can be effected by the reciprocating movement oi the lever 14a.

It will be further noted that for the retainer 14, the lever 14a is omitted and the stopper 14b can be directly provided over the opening and closing ends of the embracing arms 2, 3.

When a fishing rod 15 or the like is laterally hung on the wall surface or the ceiling, the fishing rod 15 is pressed into the opened embracing arms 2, 3 as mentioned previously, whereas when the fishing rod 15 is removed from the holder. the fishing rod 15 is pulled back and the embracing arm 3 is pulled outwardly. Further, when the fishing rod or the like is hung on the wall or the ceiling of vehicles such as automobiles or fishing boats, which are liable to subject to vibrations or shocks, the fishing rod or the like is held by the embracing arms 2, 3, and thereafter, the opening and closing ends of the embracing arms 2, 3 are hooked by the retainer 14. With this, the embracing arms 2, 3 are never opened unless the retainer 14 is removed.

Accordingly, the embracing arms are not opened even if they are subjected to great shocks under the state wherein they are under the load, and thus, it is safe even if the holder is mounted on the wall or ceiling of vehicles such as automobiles and ships so that the tennis racket or the fishing rod remains hung thereon.

What is claimed is:

1. A synthetic resin holder for use on a wall, comprising a pair of embracing arms positioned internally of a circular arc-shaped spring plate, said embracing arms having inner ends connected by a hinge and outer ends butted in an opening and closing manner, said embracing arms being equally connected by hinges to upper and lower ends of the spring plate, of support plate project inwardly from the respective ends of the spring plate to define upper and lower support plates therefor, said support plates being parallel to a center line of the holder with the lower support plate being longer than the upper support plate, and a base plate formed integral with the ends of both the support plates, said spring plate and said embracing arms being provided upwardly with respect to the base plate.

2. The holder according to claim 1, further comprising a retainer provided over opening and closing ends of the embracing arms, said retainer preventing the embracing arms from being opened of themselves.

3. The holder according to claim 2, wherein said retainer comprises a lever mounted on one of said embracing arms and a stopper mounted on said lever and in engagement with the other of said embracing arms.

4. The holder according to claim 2, wherein said retainer comprises a stopper mounted on one of said embracing arms and in engagement with the other thereof.

5. The holder according to claim 1, wherein oblique members to prevent flexure of said upper and lower support plates are integrally formed over said pair of support plates and said base plate.

* * * * *